(12) United States Patent
Zhang et al.

(10) Patent No.: US 10,103,480 B2
(45) Date of Patent: Oct. 16, 2018

(54) ATTRACTION DEVICE AND CONNECTOR

(71) Applicant: ZTE CORPORATION, Guangdong (CN)

(72) Inventors: Lei Zhang, Guangdong (CN); Yong Zhao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 15/309,088

(22) PCT Filed: Jun. 30, 2014

(86) PCT No.: PCT/CN2014/081189
§ 371 (c)(1),
(2) Date: Nov. 4, 2016

(87) PCT Pub. No.: WO2015/168978
PCT Pub. Date: Nov. 12, 2015

(65) Prior Publication Data
US 2017/0085029 A1 Mar. 23, 2017

(30) Foreign Application Priority Data
May 5, 2014 (CN) .................. 2014 2 0227264 U

(51) Int. Cl.
*B25J 15/06* (2006.01)
*H01R 13/62* (2006.01)
*H04M 1/02* (2006.01)

(52) U.S. Cl.
CPC .......... *H01R 13/6205* (2013.01); *B25J 15/06* (2013.01); *H04M 1/02* (2013.01)

(58) Field of Classification Search
CPC .................. B01R 13/62; B25J 15/06
USPC ............ 294/185, 192, 186, 189, 65.5
See application file for complete search history.

(56) References Cited

U.S. PATENT DOCUMENTS

| | | | | |
|---|---|---|---|---|
| 2,995,359 A | * | 8/1961 | Gulick | B65G 59/04 198/955 |
| 3,642,035 A | * | 2/1972 | Marand | B65B 31/003 141/20 |
| 3,866,764 A | * | 2/1975 | Leiser | B65H 3/0808 271/104 |
| 3,921,971 A | * | 11/1975 | Vollrath | B65H 3/0883 271/103 |

(Continued)

FOREIGN PATENT DOCUMENTS

| | | |
|---|---|---|
| CN | 101172344 A | 5/2008 |
| CN | 101559602 A | 10/2009 |

(Continued)

OTHER PUBLICATIONS

International Search Report dated Jan. 28, 2015 issued in PCT/CN2014/081189.

*Primary Examiner* — Paul T Chin
(74) *Attorney, Agent, or Firm* — Scully Scott Murphy & Presser

(57) ABSTRACT

A suction device and a connector are provided. The suction device has a control electromagnetic core and a suction member. A cavity is provided between the control electromagnetic core and the suction member. The suction member is operative to slide up and down within the cavity in response to changes of a magnetic property of the control electromagnetic core.

12 Claims, 3 Drawing Sheets

(56) References Cited

U.S. PATENT DOCUMENTS

| | | | | | |
|---|---|---|---|---|---|
| 4,121,865 | A | * | 10/1978 | Littwin, Sr. | B66C 1/0218 |
| | | | | | 294/186 |
| 4,266,905 | A | * | 5/1981 | Birk | B65G 47/1485 |
| | | | | | 221/211 |
| 4,397,491 | A | * | 8/1983 | Anderson | B65G 7/12 |
| | | | | | 294/131 |
| 4,736,938 | A | * | 4/1988 | Jiruse | B65H 3/0883 |
| | | | | | 271/90 |
| 4,763,941 | A | * | 8/1988 | Sniderman | B65G 47/91 |
| | | | | | 271/103 |
| 5,030,196 | A | * | 7/1991 | Inoue | A61N 2/02 |
| | | | | | 361/143 |
| 6,612,633 | B1 | * | 9/2003 | Tell | B65G 47/91 |
| | | | | | 294/186 |
| 7,878,564 | B2 | * | 2/2011 | Kang | H01L 21/6838 |
| | | | | | 294/186 |
| 7,967,351 | B2 | * | 6/2011 | Wu | B25J 15/0616 |
| | | | | | 294/189 |
| 9,108,319 | B2 | * | 8/2015 | Kniss | B25B 11/007 |

FOREIGN PATENT DOCUMENTS

| | | | |
|---|---|---|---|
| CN | 202013912 U | | 10/2011 |
| DE | 102 35 985 A1 | | 4/2004 |
| EP | 1918076 A1 | | 5/2008 |
| JP | 2-292152 | * | 3/1990 |
| JP | 6-271148 A | | 9/1994 |
| JP | 7-227787 A | | 8/1995 |
| JP | 2004-114220 A | | 4/2004 |

* cited by examiner

ATTRACTION DEVICE AND CONNECTOR

CROSS-REFERENCE TO RELATED APPLICATIONS

This application is based upon and claims priority to Chinese Patent Application No. 201420227264.6, filed May 5, 2014, the entire contents of which are incorporated herein by reference.

TECHNICAL FIELD

The present disclosure generally relates to an auxiliary device of mobile terminals, and more particularly, to a suction device and a connector.

BACKGROUND

During implementation of the technical solutions of the present disclosure, the inventors of the present disclosure found that at least the following technical problems exist in related arts:

At present, communication terminals, which have been developed towards intelligentization and portability, can be fixed onto rigid materials via conventional connectors. However, as users' requirements for carrying terminals change, wearable products have become mainstream product types. The wearable products such as straps of smart watches, belts of backpacks, clothes are usually made of flexible materials, for example, materials having a flexible structure, Flexible Printed Circuits (FPCs) and the like. The conventional connectors are good at fixing the communication terminals with rigid materials, but are weak at fixing the communication terminals with the flexible materials. Thus, the conventional connectors cannot properly fix the communication terminals on wearable products which are made of materials such as flexible materials or FPCs.

This section provides background information related to the present disclosure which is not necessarily prior art.

SUMMARY

Embodiments of the present disclosure mainly provide a suction device and a connector, which are capable of controlling connection and disconnection of the connector by the suction and release of the suction of the suction device on the body of the connector, so as to solve the problem with conventional connectors that the conventional connectors cannot properly fix communication terminals on wearable products which are made of materials such as flexible materials or FPCs.

The technical solutions of embodiments of the present disclosure can be realized as follows.

An embodiment of the present disclosure provides a suction device. The suction device 100 includes: a control electromagnetic core 1; and a suction member 2; wherein a cavity 3 exists between the control electromagnetic core 1 and the suction member 2, and the suction member 2 slides up and down within the cavity 3 according to changes of a magnetic property of the control electromagnetic core 1.

In the above technical solution, the control electromagnetic core 1 is connected with a control circuit 4 which controls a magnetic pole of the control electromagnetic core 1 according to a current flowing direction of the control circuit 4 itself.

In the above technical solution, the suction member 2 comprises: a cap 21; a sliding pillar 22; and a sucker 23; wherein the cap 21 is located at an end of the sliding pillar 22, an exhaust slim hole 221 is provided within the sliding pillar 22, an exhaust cavity 222 exists between an end of the exhaust slim hole 221 and the cap 21, and another end of the exhaust slim hole 221 is connected with a guiding hole in a center of the sucker 23.

In the above technical solution, the sliding pillar 22 slides up and down upon receipt of pulling up and down by the cap 21 so as to change a size of the exhaust cavity 222.

In the above technical solution, an exhaust hole 223 is provided at a lateral surface of the sliding pillar 22, and the exhaust hole 223 communicates with the exhaust cavity 222 when the cap 21 pulls up the sliding pillar 22.

In the above technical solution, the suction member 2 further comprises an elastic appendage 24, an end of which is connected with a top of a groove 224 which is outside the sliding pillar 22 and is disposed along a circumferential direction.

An embodiment of the present disclosure further provides a connector, including: a body having a plurality of the previously mentioned suction devices.

The embodiments of the present disclosure provide a suction device, the suction device 100 can include a control electromagnetic core 1 and a suction member 2; wherein a cavity 3 exists between the control electromagnetic core 1 and the suction member 2, and the suction member 2 slides up and down within the cavity 3 according to changes of a magnetic property of the control electromagnetic core 1. Thus, this suction device can solve the problem with conventional connectors that the conventional connectors cannot properly fix communication terminals on wearable products which are made of materials such as flexible materials or FPCs, and can also be applied in any scenario where a rigid structure needs to be connected with a flexible structure reliably, thereby bringing great economic values.

This section provides a summary of various implementations or examples of the technology described in the disclosure, and is not a comprehensive disclosure of the full scope or all features of the disclosed technology.

| Listing of reference signs | | | |
|---|---|---|---|
| 100 | suction device | 1 | control electromagnetic core |
| 2 | suction member | 21 | cap |
| 22 | sliding pillar | 221 | exhaust slim hole |
| 222 | exhaust cavity | 223 | exhaust hole |

-continued

| Listing of reference signs | | | |
|---|---|---|---|
| 224 | groove | 23 | sucker |
| 24 | elastic appendage | 3 | cavity |
| 4 | control circuit | 41 | first switch |
| 42 | second switch | 5 | connector |

DETAILED DESCRIPTION

The present disclosure will be described below in detail with reference to drawings.

Figure 1:
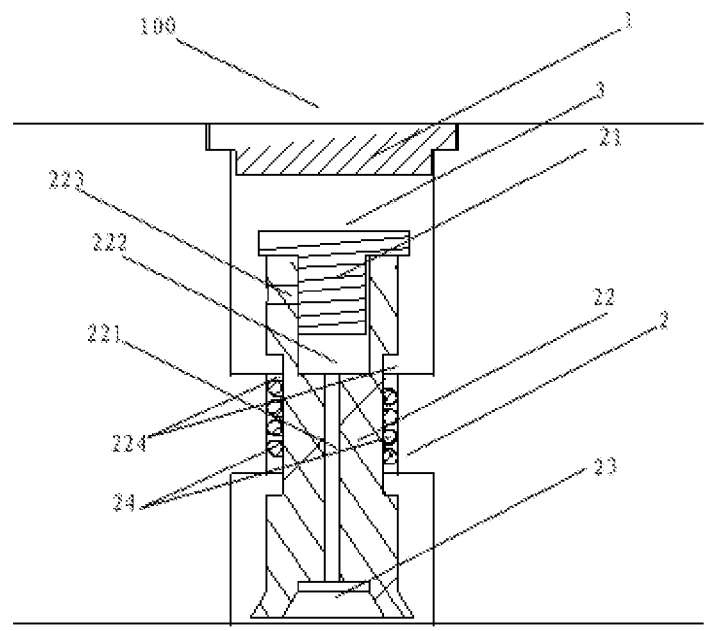
FIG. 1 is a cross-sectional view of a suction device according to an embodiment of the present disclosure.

As shown in FIG. 1, a suction device 100 according to an embodiment of the present disclosure includes: a control electromagnetic core 1 and a suction member 2; wherein a cavity 3 exists between the control electromagnetic core 1 and the suction member 2, and the suction member 2 slides up and down within the cavity 3 according to changes of a magnetic property of the control electromagnetic core 1. In this way, by controlling the suction member 2 electromagnetically, the suction and release of the suction of the suction member 2 can be controlled, and thereby the connection and disconnection of the connector can be realized. Consequently, connection and disconnection between a rigid material and a flexible material can be realized.

Figure 2:
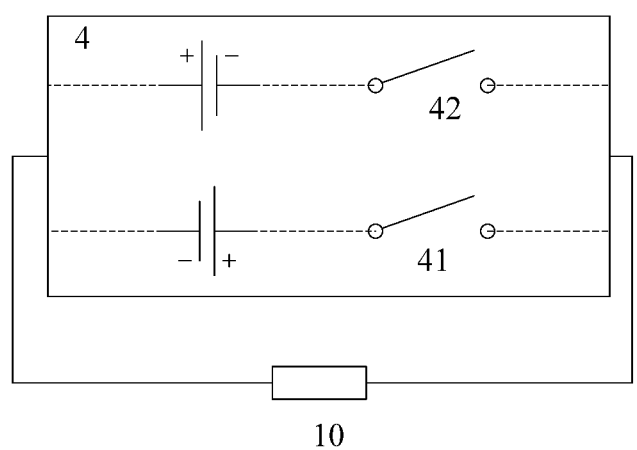
FIG. 2 is a schematic diagram showing principles for controlling a control electromagnetic core according to an embodiment of the present disclosure.

As shown in FIG. 2, the control electromagnetic core 1 is connected with a control circuit 4 which controls a magnetic pole of the control electromagnetic core 1 according to a current flowing direction of the control circuit 4 itself.

Here, as shown by the dotted lines in the control circuit 4 in FIG. 2, the principles for controlling the control electromagnetic core will be explained with an example of a power source having positive and negative electrodes. When a first switch 41 is closed and the second switch 42 is open, the control electromagnetic core 1 can generate an N magnetic pole. When the first switch 41 is open and the second switch 42 is closed, the control electromagnetic core 1 can generate an S magnetic pole. The different magnetic poles generated by the control electromagnetic core 1 act on the suction member 2 so as to control the suction member 2 to suck and release the suction and thereby to control suction and release of suction on the flexible materials.

In actual applications, any control circuit equivalent to or similar to the control circuit 4 as shown by the dotted line in FIG. 2 can be used to change the magnetic poles of the control electromagnetic core 1, and the present disclosure does not impose specific limitations on this.

Referring to FIG. 1, the suction member 2 may include a cap 21, a sliding pillar 22 and a sucker 23. The cap 21 is located at an end of the sliding pillar 22, an exhaust slim hole 221 is provided within the sliding pillar 22, an exhaust cavity 222 exists between an end of the exhaust slim hole 221 and the cap 21, and another end of the exhaust slim hole 221 is connected with a guiding hole in a center of the sucker 23. Here, the sucker 23 can have a tapered basin shape. The sliding pillar 22 may be a permanent magnet having definite magnetic poles. Throughout the description, the suction and release of suction of the suction member 2 in the embodiments are described with an example that the sliding pillar 22 is an N pole, and however, the present disclosure does not define that the sliding pillar 22 has to be an N pole.

The sliding pillar 22 slides up and down upon receipt of pulling up and down by the cap 21 so as to change a size of the exhaust cavity 222. An exhaust hole 223 is provided at a lateral surface of the sliding pillar 22, and the exhaust hole 223 communicates with the exhaust cavity 222 when the cap 21 pulls up the sliding pillar 22. Specifically, the sliding pillar 22 slides down to contact a flexible material which is to be sucked by the suction device 100, and then the sliding pillar 22 slides up; at this time, the sliding pillar 22 slides to a height which cannot make the exhaust hole 223 communicate with the exhaust cavity 222, and a negative pressure exists among the sliding pillar 22, the sucker 23 and the flexible material, and thus the flexible material is reliably sucked on the sucker 23 and thereby the flexible material is sucked on the suction device 100. If the sliding pillar 22 slides up to a height which can enable the exhaust hole 223 communicate with the exhaust cavity 222, gas (air) is introduced into the exhaust cavity 222 and the slim hole 221 of the sliding pillar 22 via the exhaust hole 223, so that the negative pressure is released, the sucker 23 does not have a suction force at this time, and the suction device 100 releases the flexible material.

The suction member 2 further comprises an elastic appendage 24, an end of which is connected with a top of a groove 224 which is outside the sliding pillar 22 and is disposed along a circumferential direction. For example, the elastic appendage 24 can be a spring. When the sliding pillar 22 slides down, the elastic appendage 24 generates an elastic force which is intended to make the sliding pillar 22 to slide upwards due to accumulation of elastic potential energy; however, the elastic force generated by the elastic potential energy is relatively small, the height which the sliding pillar 22 slides to cannot enable the exhaust hole 223 communicate with the exhaust cavity 222, and thus a negative pressure occurs, and a strong suction force is generated.

In actual applications, an opening is provided at the top of the suction member 2 to receive the cap 21, the sliding pillar 22 and the elastic appendage 24. The top diameter of the sliding pillar 22 is the same with the outer diameter (the diameter for fitting) of the cap 21. What is disposed below is the exhaust slim hole 221 which has a relatively small inner diameter to fit with the sucker 23 below the sliding pillar 22. The maximum radius of the exhaust slim hole 221 is not greater than 0.5 mm. The sucker 23 is hidden in the suction member 2, and as the sliding pillar 22 slides down, the sucker 23 contact the flexible material which is to be sucked by the suction device 100 to suck the material.

Figure 3:
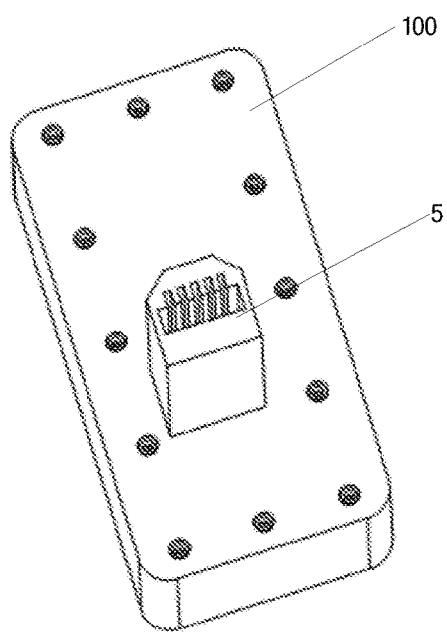
FIG. 3 is a perspective view illustratively showing a structure of a connector according to an embodiment of the present disclosure.
Figure 4:
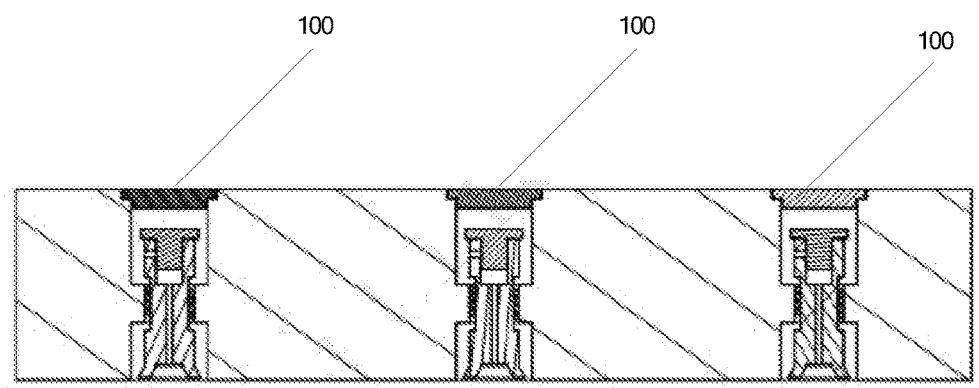
FIG. 4 is a cross-sectional view showing local parts of a connector according to an embodiment of the present disclosure.
Figure 5:
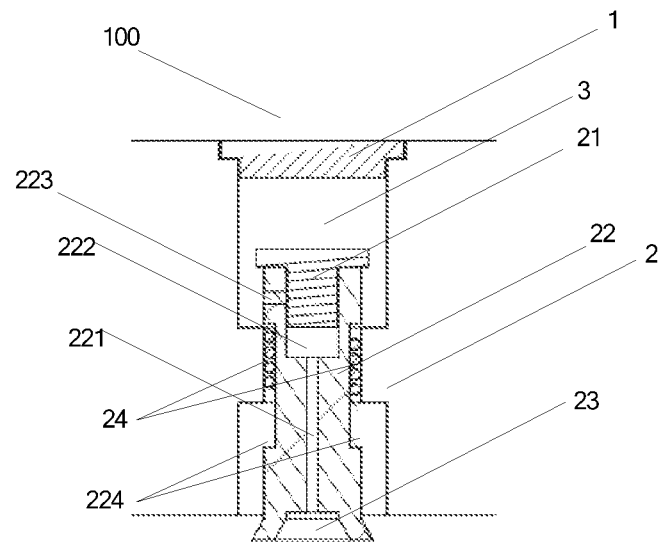
FIG. 5 is a cross-sectional view illustratively showing a suction state of a suction device according to an embodiment of the present disclosure.

An embodiment of the present disclosure further provides a connector using the suction device 100, as shown in FIGS. 3 and 4. A body of the connector is embedded with a plurality of suction devices 100. Referring to FIG. 5, twelve suction devices 100 are embedded into the connector. A connection portion 5 disposed in the center of the body of the connector is an interface of the connector, like conventional connectors. The suction devices 100 are distributed around the connection portion 5 and around the body of the connector. The connection and disconnection of the connector with and from the flexible material are the suction and release of suction of the plurality of suction devices 100 embedded on the connector. The number of the suction devices 100 embedded on the connector can vary according to actual requirements, and embodiments of the present disclosure do not impose specification on the number of the suction devices 100.

The connection and disconnection of the connector provided by the embodiment of the present (i.e., the suction and release of the suction of the suction devices 100 embedded on the connector) will be described with reference to drawings. The cavity 3 exists between the control electromagnetic core 1 and the suction member 2 of the suction device 100, and the suction member 2 slides up and down within the cavity 3 according to changes of a magnetic property of the control electromagnetic core 1 so as to realize gas introduction and gas exhaust, and thereby suction and release of the suction of the suction device 100 can be realized. The specification procedure is as follows.

The connection procedure will be explained with reference to FIGS. 2 and 5.

When the first switch 41 is closed and the second switch 42 is open, the control electromagnetic core 1 generates an N magnetic pole. At this time, because the cap 21 and the control electromagnetic core 1 have the same pole, a repulsion force which makes the cap 21 and the control electromagnetic core 1 repel each other is generated. Due to the action of the repulsion force, the cap 21 pushes the sliding pillar 22 to slide down. The sucker 23 slides down as the sliding pillar 22 slides down, and protrudes outside the surface of the connector to contact the flexible material which is to be sucked by the suction device 100 so as to prepare for the later suction. As the sliding pillar 22 slides down, the elastic potential energy of the elastic appendage 24 is accumulated. When the first switch 41 is open, the elastic appendage 24 is pulled by the restoring force generated by the elastic potential energy, the sliding pillar 22 returns back (i.e., sliding up), and at the same time the sucker 23 draws a surface of the flexible material, and the volume of the exhaust slim hole 221 and the exhaust cavity 222 becomes larger while the gas contained by the exhaust slim hole 221 and the exhaust cavity 222 keeps unchanged; as a result, a negative pressure occurs to suck the flexible material reliably. Consequently, the connector is connected with the flexible material.

Figure 6:
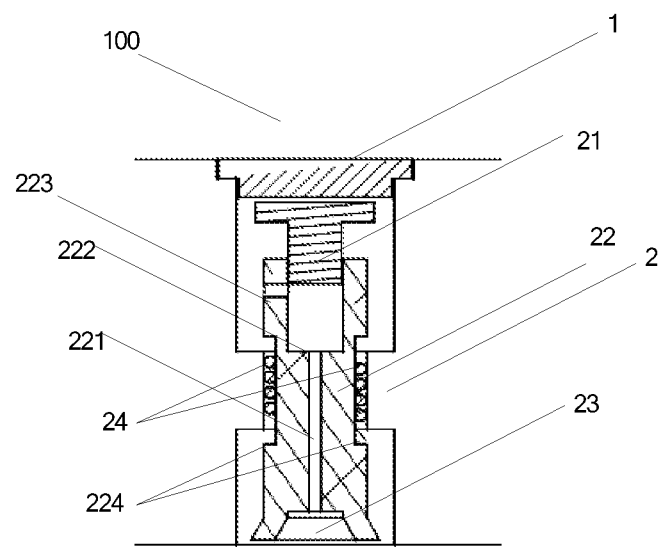
FIG. 6 is a cross-sectional view illustratively showing a release state of a suction device according to an embodiment of the present disclosure.

The disconnection procedure will be explained with reference to FIGS. 2 and 6.

When the second switch 42 is closed and the first switch 41 is open, the control electromagnetic core 1 generates an S magnetic pole. At this time, because the cap 21 and the control electromagnetic core 1 have different poles, an attraction force is generated. Due to the action of the attraction force, the cap 21 pulls the sliding pillar 22 to slide up. When the sliding pillar 22 slides to a height which enables the exhaust hole 223 to communicate with the exhaust cavity 222, gas is introduced via the exhaust hole 223, the sucker 23 in a suction state releases the flexible material and thereby the connector is disconnected from the flexible material.

In actual applications, the connector provided by embodiments of the present disclosure can be arranged on products having a rigid structure, for example, smart phones, and the flexible materials which are to be sucked (for example, a strap of a smart watch, wearable bands, and the like) can be materials having a surface (which is to be sucked) with a roughness equal to or smaller than Ra0.05.

In the connector provided by embodiments of the present disclosure, changes of positive and negative electrodes can be controlled by switches or equivalent switches, or the control on the connector can be realized depending on peripheral circuits of existing smart phones. By keeping the main structure of existing connectors unchanged, the present discloses proposes an electrically controlled connector based on a negative pressure principle to realize connection and disconnection, and the suction and release of suction of the sucker is realized by electromagnetically controlling the sliding pillar to slide up and down, and consequently the connection and disconnection can be realized. The connector provided by embodiments of the present disclosure can be applied in scenarios such as carrying scenarios (situations where users need to carry terminals by the connectors) and data exchange scenarios. For example, a user may possess a smart watch and a smart phone, and it is not convenient to carry the smart phone with a large screen when the user is outside. Under such condition, the user can use the connector to suck the smart phone on the strap of the smart watch, or the belt of a backpack. As another example, in a data exchange scenario, a wearable product used by a user may need to directly transmit data with a smart phone. If a conventional connector is used, the reliability is poor. On the contrary, by using the connector provided by embodiments of the present disclosure, the reliability and easiness can be improved.

The above embodiments are some exemplary embodiments of the present disclosure, which are not intended to limit the scope of the present disclosure in any way.

What is claimed is:

1. A suction device, wherein the suction device comprises:
   a control electromagnetic core; and
   a suction member;
   wherein a cavity is provided between the control electromagnetic core and the suction member, and the suction member slides up and down within the cavity according to changes of a magnetic property of the control electromagnetic core to realize gas introduction and gas exhaust.

2. The suction device according to claim 1, wherein the control electromagnetic core is connected with a control circuit which controls a magnetic pole of the control electromagnetic core according to a current flowing direction of the control circuit itself.

3. The suction device according to claim 1, wherein the suction member comprises:
   a cap;
   a sliding pillar; and
   a sucker;
   wherein the cap is located at an end of the sliding pillar, an exhaust slim hole is provided within the sliding pillar, an exhaust cavity exists between an end of the exhaust slim hole and the cap, and another end of the exhaust slim hole is connected with a guiding hole in a center of the sucker.

4. The suction device according to claim 3, wherein the sliding pillar slides up and down upon receipt of pulling up and down by the cap so as to change a size of the exhaust cavity.

5. The suction device according to claim 3, wherein an exhaust hole is provided at a lateral surface of the sliding pillar, and the exhaust hole communicates with the exhaust cavity when the cap pulls up the sliding pillar.

6. The suction device according to claim 3, wherein the suction member further comprises an elastic appendage, an end of which is connected with a top of a groove which is outside the sliding pillar and is disposed along a circumferential direction.

7. A connector, comprising:
   a body having a plurality of the suction devices embedded on the body;
   wherein each of the suction devices comprises:
   a control electromagnetic core; and
   a suction member;
   wherein a cavity is provided between the control electromagnetic core and the suction member, and the suction member slides up and down within the cavity according to changes of a magnetic property of the control electromagnetic core to realize gas introduction and gas exhaust.

8. The connector according to claim 7, wherein the control electromagnetic core is connected with a control circuit which controls a magnetic pole of the control electromagnetic core according to a current flowing direction of the control circuit itself.

9. The connector according to claim 7, wherein the suction member comprises:

a cap;

a sliding pillar; and a sucker;

wherein the cap is located at an end of the sliding pillar, an exhaust slim hole is provided within the sliding pillar, an exhaust cavity exists between an end of the exhaust slim hole and the cap, and another end of the exhaust slim hole is connected with a guiding hole in a center of the sucker.

10. The connector according to claim 9, wherein the sliding pillar slides up and down upon receipt of pulling up and down by the cap so as to change a size of the exhaust cavity.

11. The connector according to claim 9, wherein an exhaust hole is provided at a lateral surface of the sliding pillar, and the exhaust hole communicates with the exhaust cavity when the cap pulls up the sliding pillar.

12. The connector according to claim 9, wherein the suction member further comprises an elastic appendage, an end of which is connected with a top of a groove which is outside the sliding pillar and is disposed along a circumferential direction.

\* \* \* \* \*